No. 772,618. PATENTED OCT. 18, 1904.
T. E. P. KEEGAN.
SUPPORT FOR TRAP NETS.
APPLICATION FILED MAR. 30, 1904.
NO MODEL. 2 SHEETS—SHEET 2.

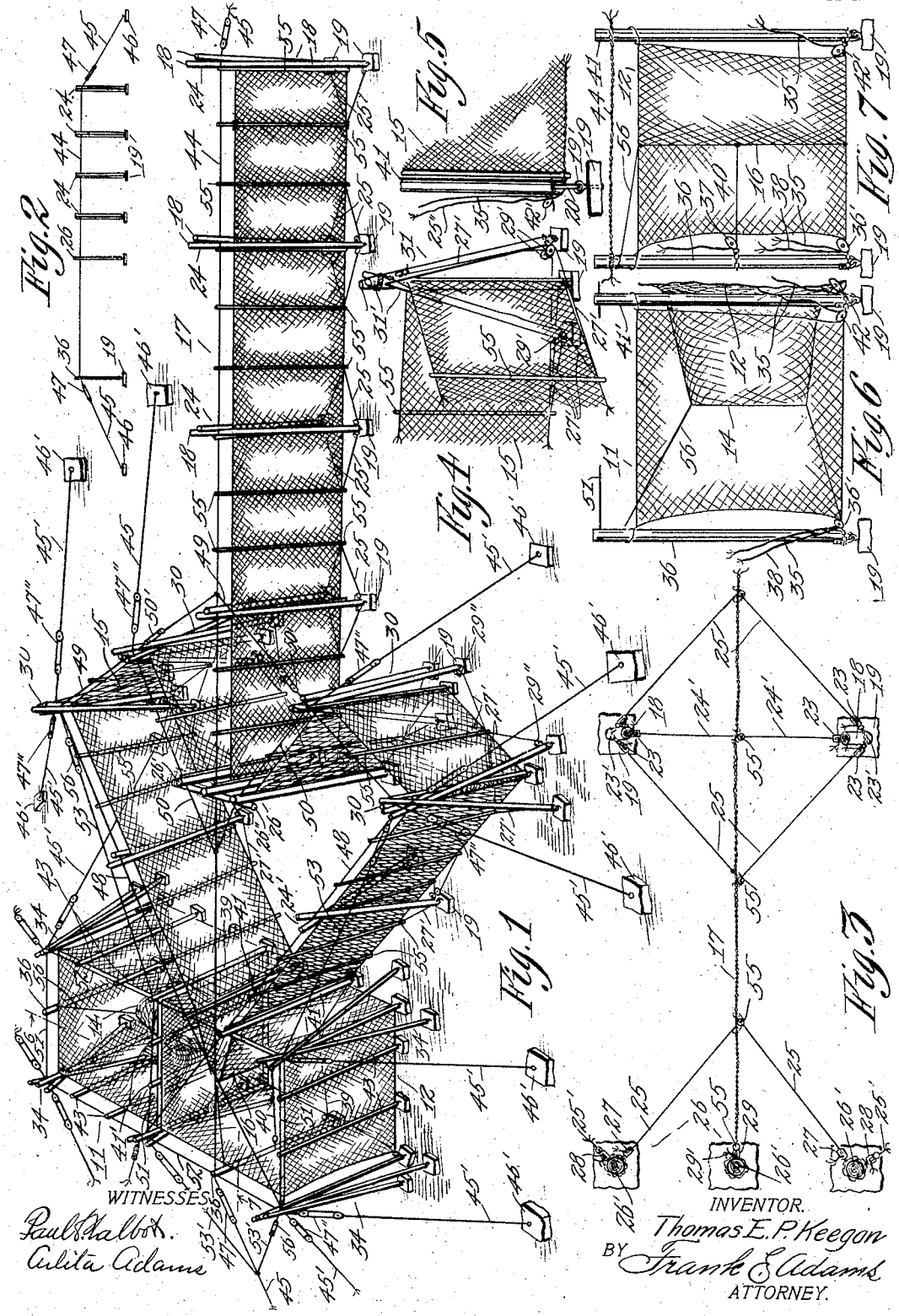

WITNESSES:
Paul T. Talbot
Arlita Adams

INVENTOR.
Thomas E. P. Keegan
BY Frank E. Adams
ATTORNEY.

No. 772,618. Patented October 18, 1904.

UNITED STATES PATENT OFFICE.

THOMAS E. P. KEEGAN, OF TACOMA, WASHINGTON.

SUPPORT FOR TRAP-NETS.

SPECIFICATION forming part of Letters Patent No. 772,618, dated October 18, 1904.

Application filed March 30, 1904. Serial No. 200,788. (No model.)

*To all whom it may concern:*

Be it known that I, THOMAS E. P. KEEGAN, a citizen of the United States of America, and a resident of the city of Tacoma, in the county of Pierce and State of Washington, have invented certain new and useful Improvements in Supports for Trap-Nets, of which the following is a specification.

My invention relates to improvements in means for sustaining trap-nets in position for fishing, and has special reference to a portable support of this class which rests upon the bed of the water.

Among the objects attained by this invention and readily understood from the following specifications and accompanying drawings, included as a part thereof, is the production of a simple and inexpensive portable support for trap-nets especially useful in bodies of water whose beds are of a nature to prohibit the driving of piling and embodying essential features of adaptability, utility, and general efficiency which render the support easy to instal and remove, insures the position of the net when set, and facilitates the hanging and lifting of the webbings.

The above-mentioned and other desirable objects are attained by the constructions, combinations, and arrangements of parts, as disclosed on the drawings, set forth in this specification, and succinctly pointed out in the appended claims.

With reference to the drawings filed herewith and bearing like reference characters for corresponding parts throughout, Figure 1 is a perspective view showing the support with the parts arranged to sustain a trap-net of ordinary form and shows the webbings in position. Fig. 2 is a side elevation, on small scale, of parts of the support adapted to sustain the webbing of the lead. Fig. 3 is a horizontal section at the inner end of the lead and shows relative parts of the support. Fig. 4 is a perspective view of a portion of the heart at one corner and shows relative parts of the support. Fig. 5 is a fragmentary side view of one of the walls of the heart at the apex and shows relative parts of the support. Fig. 6 is a vertical section of the spiller, taken on line 6 of Fig. 1, and shows relative parts of the support. Fig. 7 is a vertical section of the pot, taken on line 7 of Fig. 1, and shows relative parts of the support. Fig. 8 is a perspective view, on large scale, of a portion of the webbing of the lead and shows relative parts of the support. Fig. 9 is a perspective view, on large scale, of a portion of the webbing of the pot and shows relative parts of the support; and Fig. 10 is a horizontal section of one of the legs of the support.

In the present instance my net-support is shown and described with the parts arranged to sustain the webbing of a trap-net of well-known form and consisting of a spiller 11, a pot 12, having a tunnel 14 leading to the spiller, a heart 15, opening to a tunnel 16, extending into the pot, and a lead 17, extending outwardly from the mouth of the heart; but I do not limit the scope of the invention to this particular net, as it is adaptable to support webbing in various other forms, as will be understood from the following.

The invention includes portable supporting-legs which are arranged along the course of the webbings either singly or in multiplicity, as desired, and are preferably buoyant, and conveniently consist of sticks of timber of suitable length to project well above the surface of the water when set in the respective positions they are to occupy. These legs are suitably weighted to cause them to sink at one end, so as to facilitate their installation, and in the present instance a foot-weight, as 19, is attached to one end of each leg for this purpose, and these weights conveniently consist of flat stones of suitable size to hold the legs from being shifted at the base ends by action of the water after they are set in position as the support is being installed. These foot-weights 19 also act as footings for the legs to bear upon, and they are suitably swingingly connected thereto, so that the legs can be swung to a suitable inclination after they are placed in position, if desired, and for the purpose of swingingly connecting the legs and foot-weights an eyebolt, as 19', is suitably secured in an aperture provided in each foot-weight, and a U-shaped strap, as 20, is fitted loosely in the eye of said bolt and conveniently fastened to one end of the leg. As stated, the legs hereinbefore described are set single at some points and in multiplicity at other points along the courses of the webbings of the net to provide supporting members for the same, and suitable ties and guys are arranged to sustain these supporting members, and suitable stay-ropes and haul-down ropes are arranged with these members to sustain the webbings of the net when set, as will be understood from the following. Furthermore, the support is preferably installed before the webbings are placed in position thereon and the webbings entirely removed before the support is taken up.

For the support of the main portion of the webbing of the lead 17 sheers 24 are provided and disposed at suitable points along the course of the lead, and each of these sheers consists of a pair of the legs heretofore described, and which are indicated by the reference-numeral 18, and are weighted at the lower ends, as heretofore set forth. These legs 18 are set with the lower ends at suitable separation to form an extended base and are conveniently secured together adjacent their upper ends at a suitable distance above the surface of the water to permit the webbing of the lead to be passed between the legs and suspended therefrom. These sheers straddle the webbing of the lead, and they are conveniently installed by first lowering the legs in a vertical position at the proper points along opposite sides of the course of the lead, and then swinging the opposite legs together at the upper ends, so that they cross each other well above the surface of the water, when the legs of each pair are then securely fastened together at the cross by lashings, consisting of chains or ropes 22'. (See Fig. 8.) The sheers can be easily installed in the above manner, and irregularities of the bed of the water at the points where the legs rest readily compensated for when the legs are swung together, so that the points of crossing of the legs in all of the sheers can be arranged substantially in alinement for a more perfect hanging of the webbing. Previous to placing the legs of the sheers in position suitable rope-guides, as pulley-blocks 23, (see Figs. 3, 8, and 10,) are conveniently attached to each leg adjacent the lower end by engaging the hooks or eyes on the blocks with the links of a section of chain 23', which is fastened about the legs. These guides are suitably disposed on the legs of the sheers to guide stay-ropes 24 and 25, which are employed to sustain the lower edge of the webbing of the lead, as will be later understood, and which are rove in the guides and temporarily secured at the ends to the upper ends of the legs before the legs are lowered into the water.

To support the end portions of the webbings of heart 15 and lead 17 at the mouth of the heart, a frame 26 is provided, and consists of three of the heretofore-described legs, which are marked 26' and are weighted at the lower ends, as heretofore set forth, and these legs are arranged in vertical positions at suitable separation from each other, and a cross-piece 26'' is secured to these legs adjacent the upper ends, as a tie, after they are in position. Attached to the side legs of this frame adjacent their lower ends are rope-guides 27 and 28, consisting of pulley-blocks fastened to chain-sections secured about the legs, and the guides 27 are arranged for stay-ropes 25 for the webbing of the lead and the guides 28 for haul-down ropes 25', adapted to secure the lower end corners of the webbing of the heart at the mouth. These blocks, with the ropes thereon, are placed in position before the legs are lowered into the water, and a similar guide 29 is likewise attached to the center leg for a haul-down rope 29', adapted to secure the lower inner corner of the webbing of the lead. For the support of the webbings of heart 15 at the corners standards 30 (see Fig. 1) or 31 (see Fig. 4) are provided, and each of the former consists of four of the heretofore-described legs, which are marked 30' and are weighted at the lower ends, as heretofore set forth, and one of the legs is set in vertical position just at a respective corner of the heart, another is set at a suitable distance inside of said corner, and the other two are set outside of the corner at opposite points. The outer and inner legs are then swung at the upper ends, so as to cross the vertical leg at a suitable distance above the surface of the water, and all four legs are conveniently secure together at the point of crossing by lashings. The standard 31, which is used, if desired, in place of standard 30, comprises a tripod, as shown in Fig. 4, and consists of three of the heretofore-described legs, which are marked 31' and weighted at the lower ends, as heretofore set forth, and one of these legs is set in a vertical position at the corner of the heart and the other two are set one inside and the other outside of the corner and are then swung at the upper ends, so as to cross the vertical leg at a suitable distance above the surface of the water, and all three legs are conveniently secured together at the point of crossing by lashings. Attached to the inner legs of the standards 30 and 31 and to the outer legs of standard 31 adjacent to the lower ends are opposite rope-guides, as 29', Fig. 4, consisting of pulley-blocks fastened to chain sections secured about the legs, as heretofore set forth, for the guides on the legs of the sheers, and these guides are arranged for stay-ropes 27' (see Fig. 4) for the webbings of the heart, while a similar guide 29'' is likewise attached to each of the outer legs of standard 30 for stay-ropes 27' for the webbings. Either of these standards may be used, as desired, and the rope-guides and stay-ropes are arranged on the legs thereof before they are set, as heretofore set forth, for the guides and stay-ropes on the sheers 24. Where the walls of the heart are of extended length— as, for example, where they diverge outwardly from the apex—sheers 24, identical in form to the sheers 24 for the lead and likewise weighted at the lower ends of the legs, are installed in a similar manner along the courses of the walls at suitable points, and the legs of the sheers 24' have rope-guides for stay-ropes 27' for the webbing of the heart attached thereto and arranged in the same manner as the rope-guides on the legs of the sheers 24.

For the support of the webbing of pot 17 and spiller 11 standards 34 are disposed at the corners thereof, excepting at the contiguous corners adjacent the heart, where a single leg 39 is set. These standards each comprise a tripod, (see Fig. 9,) consisting of three of the heretofore-described legs, which are marked 34' and are weighted at the lower ends, as heretofore set forth, and one of these legs is set in a vertical position at a respective corner and the other two are set outside of the corner at opposite sides thereof and are then swung at the upper ends, so as to cross the vertical leg at a suitable distance above the surface of the water, and all three legs are conveniently secured together at the point of crossing by lashings consisting of ropes or chains. Attached to the vertical legs of these standards are rope-guides 32' for haul-down ropes 35 for the webbings and consisting of pulley-blocks fastened to chain sections secured about the legs, and these guides and ropes are arranged on the legs before they are lowered into the water, as heretofore set forth, for the guides and ropes on the legs of the sheers. Directly opposite to the mouths of tunnel 16 of the pot and tunnel 14 of the spiller single legs 36, which are weighted at the lower ends, as heretofore set forth, are set at the courses of the webbings, (see Figs. 6 and 7,) and attached to these legs adjacent the lower ends are rope-guides 36' consisting of double pulley-blocks, and substantially midway the length of the leg 36, standing opposite to the tunnel 16, a rope-guide 37, consisting of a pulley-block, is attached. Rove in the double guides 36' are haul-down ropes 35 and tie-ropes 38, and rove in the guide 37 is a tie-rope 40. The tie-ropes are adapted to hold the webbings of the tunnels to form, and the haul-down ropes are employed to secure the lower edges of the walls of the pot and spiller at these legs. At the point of entrance of the tunnel 16 into the pot single legs 41 are set at opposite sides of the tunnel, and single legs 41' are also set at opposite sides of the tunnel 14 at the point of its entrance into the spiller, and the last said legs are set between the contiguous walls of the spiller and pot and have rope-guides 42 (see Fig. 6) attached thereto adjacent the lower ends at opposite sides and arranged for haul-down ropes 35 for the webbing of the spiller and pot, and the first said legs have rope-guides 42' (see Fig. 7) attached thereto at one side adjacent the lower ends for haul-down ropes 35 for the webbing of the pot, and a haul-down rope 25" (see Fig. 5) is slidably engaged with the lower end of each of the legs 41 for the ends of webbings of the heart before they are installed. These legs 41 and 41' are weighted at the lower ends, and the rope-guides thereon comprise pulley-blocks suitably arranged and secured to the legs in the manner heretofore set forth for securing the rope-guides to the legs of the sheers 24. To further support the webbings of the pot and spiller, single legs 43, weighted at the lower ends, as heretofore set forth, for the legs of the sheers 24 are set at suitable intervals along the course of the webbings between the corners thereof, and these legs have rope-guides 42" (see Fig. 10) attached thereto adjacent their lower end for haul-down ropes 35 for the webbings, and the leg 39, which is set at the contiguous corners of the pot and spiller next to the heart, is provided with similar rope-guides for haul-down ropes for the webbings at these corners.

In arranging the support the sheers 24 are placed at intervals of approximately thirty feet, with one of the sheers at the outer end of the course of the lead, and the frame 26 is set at the inner end thereof. The standards 30 or 31 are set at the corners of the courses of the webbings of the heart and the sheers 24' set along said courses, as heretofore set forth. At the corners of the courses of the webbings of the pot and spiller the standards or tripods 34 and the single leg 39 are set, and the legs 41 and 41' are arranged at opposite sides of the positions of the tunnels 16 and 14, respectively, and the legs 36 are set opposite to the said tunnels, while the single legs 43 are arranged along the courses of the webbings at suitable intervals.

The sheers 24 are connected with a suitable tie, conveniently consisting of a rope or cable 44, which extends from the outer sheers to the leg 36, lying opposite to tunnel 16, and this rope or cable is disposed in the upper crotches of the sheers and is fastened to the said sheers and to leg 36 and also to frame 26 in any suitable manner, as by means of lashings consisting of sections of rope or chain passed about the said supporting members and tie. At each end of this tie is a guy 45, conveniently consisting of a rope or cable, which is attached to a suitable anchor conveniently consisting of a large flat stone 46 of suitable weight and to which an eyebolt is secured for attaching the guy to the anchor. Embodied with the guy is a take-up 47 for tightening the guy and consisting of a pair of suitable pulley-blocks, one of which is attached to the supporting member at the end of the tie 44 and the other attached to the inner end of the guy, and a fall-rove through said blocks.

The supporting members for the webbings of the heart are connected with suitable ties conveniently consisting of opposite ropes or cables 48, 49, and 50, the former of which are secured to standards 30, which lie at the outer corners of the heart and pass through the upper crotches of the sheers 24' and extend diagonally across the pot 12 to opposite standards 34, to which they are secured, and the ties 49 are secured to the standards 30 at the outer corners of the heart and extend across the inner standards 30, to which they are secured, and to the tie 44, to which they are fastened, and each of the ties 49 embodies a take-up 50', consisting of a pair of suitable pulley-blocks and a fall-rove in said blocks. The ties 49 are secured to the inner standards 30 and pass across the frame 26, to which they are secured, and extend to the tie 44, to which they are fastened.

The supporting members for the webbings of the pot 12 and spiller 11 are connected at the upper ends with suitable ties, consisting of ropes or cables 51 and 52, which are secured to the corner-supports 34 and extend along the courses of the webbings and are secured to the single legs which are arranged along said courses. Opposite tie ropes or cables 53 are secured to the supporting members at the corners of the pot next to the heart and extend to and are secured to the standards 30 at the outer corners of the heart, and opposite tie ropes or cables 53' are secured to the supporting members 30 at the opposite corners of the pot and converge outwardly therefrom and are fastened to the guy 45, and each of the ties 53 and 53' embodies a take-up 56, consisting of a pair of suitable pulley-blocks and a fall-rove in said blocks.

Reference character 45' indicates guys which are attached to the supporting members at the corners of the heart, pot, and spiller, as shown, and extend outwardly and downwardly substantially in alinement with the courses of the webbings, and these guys are attached to suitable anchors conveniently consisting of large flat stones 46' of suitable weight and to which eyebolts are secured for attaching the guys to the anchors. Embodied with each of these guys is a take-up 47", consisting of a pair of suitable pulley-blocks, one of which is attached to a respective supporting member and the other to the inner end of the guy, and a fall-rove in the blocks.

Before hanging the webbings of the head and heart vertically-disposed ribs 55 are secured thereto at suitable intervals, and these ribs consist of sticks of timber of somewhat greater length than the width of the webbing, and they are conveniently fastened to the top and bottom ropes of the webbings by lashings and project above the top rope and are lashed at the projecting ends to the tie ropes or cables, which are connected with the tops of the supporting members, and thereby serve as hangers for the webbings. These ribs are arranged on the webbings of the lead at approximately ten-foot intervals, with one rib at each end, so that a rib will lie at each of the supporting members of the lead and two in the intervals between said members when the webbing is hung, and the ribs are likewise arranged on the webbings of the heart so that they will lie at the supporting members thereof and at suitable points in the intervals therebetween.

In proceeding to hang the webbing of the lead the stay-ropes 24' are fastened at one end to the lower ends of the ribs 55, which will lie at respective supporting members of the lead, the haul-down rope 29' is secured at one end to the lower end of the adjacent end rib, and the stay-ropes 25 are secured at one end to the lower end of the ribs adjacent respective supports. The free ends of all of these ropes are then drawn upon to bring the lower edge of the webbing to place as the webbing is lowered, and the upper ends of these ropes are then made fast to suitable cleats provided on the supporting members at their upper ends, and the upper ends of the ribs are lashed to the tie 44. The webbings of the heart are passed outside of the vertical legs of the corner-supports 30, and the webbings are hung in a similar manner to the webbings of the heart, the haul-down ropes 25' and 25" being secured at one end to the lower ends of respective end ribs 55 and the stay-ropes 27' secured at one end to the lower ends of the ribs 55, which will lie adjacent respective supporting members. These stay-ropes and haul-down ropes are then drawn upon as the webbings are lowered, and the upper ends of the ribs are secured to the tie ropes or cables of the supporting members.

The webbings of the pot and spiller are hung at the inner sides of the supporting members thereof, so that they can be readily lifted, as desired, to take out the fish, and the wall of the pot adjacent the heart is formed with suitable extensions to provide the walls of the tunnel 16, and the tunnel 14 is formed on the wall of the pot adjacent the spiller and projects into the spiller through a suitable aperture formed in the wall thereof. In proceeding to hang the webbings of the pot and spiller the tie-ropes 38 are secured at one end to the lower edges of the tunnels 14 and 16 and the tie-rope 40 likewise secured to the edges of the walls of the tunnel 16 substantially midway its length, the top ropes of the webbings are lashed to the supporting members, and the haul-down ropes 35 are secured at one end to the bottom ropes of the webbings. These tie-ropes and haul-down ropes are then drawn upon to pull the webbings to form and are then fastened to suitable cleats arranged on the supporting members, and tie-ropes 56 are secured to the top edges of the tunnels 14 and 16 and to the supporting members lying opposite the tunnels.

From the foregoing it will be readily understood that the webbings of the net can be hung or taken up, as desired, without disturbing the support and the support readily removed at the end of the fishing season for storage and treatment of the legs for protection against the ravages of the teredo.

Having thus described my invention, what I claim as new, and desire to secure by Letters Patent of the United States of America, is—

1. In a support for trap-nets, a leg supported at its lower end for a swinging movement.

2. In a support for trap-nets, a leg, and a weight attached to one end thereof, said leg having a movement independent of the weight.

3. In a support for trap-nets, a leg, and a foot-weight swingingly attached to said leg.

4. In a support for trap-nets, a leg comprising a stick of timber, and a foot-weight swingingly attached to said leg.

5. In a support for trap-nets, a supporting member consisting of a plurality of portable legs set with their lower ends at suitable separation and connected adjacent the upper ends after they are so set.

6. In a support for trap-nets, a supporting member consisting of a plurality of portable legs weighted at their lower ends and set with said ends at suitable separation and connected adjacent the upper ends after they are so set.

7. In a support for trap-nets, a supporting member consisting of a plurality of legs set with their lower ends at suitable separation and swung together adjacent their upper ends after they are so set.

8. In a support for trap-nets, a supporting member consisting of a plurality of legs weighted at their lower ends and set with said ends at suitable separation and swung together adjacent their upper ends after they are so set.

9. In a support for trap-nets, a supporting member consisting of a plurality of legs, set with their lower ends at suitable separation and swung together adjacent their upper ends after they are so set, and foot-weight swingingly attached to the said legs.

10. In a support for trap-nets, a supporting member consisting of a plurality of legs set with their lower ends at suitable separation and swung together and crossing each other adjacent their upper ends after they are so set.

11. In a support for trap-nets, a series of portable supporting members disposed along the course of the webbing and resting on the bed of the water, a tie connected with said members, and guys for said members.

12. In a support for trap-nets, a series of portable supporting members disposed along the course of the webbing and resting on the bed of the water, a tie connected with said members, guys, anchors for said guys, and take-ups connected with said guys and with said members.

13. In a support for trap-nets, a series of portable supporting members disposed along the course of the webbing and resting on the bed of the water, a tie connected with said members, guys, anchor-weights connected with said guys, and take-ups connected with said guys and with said members at the ends of the tie.

14. In a support for trap-nets, a series of portable supporting members disposed along the course of the webbing and resting on the bed of the water, stay-ropes slidably connected with said members adjacent their lower ends and connected with the said webbing, a tie connected with said members, and guys for said members.

15. In a support for trap-nets, a series of supporting members disposed along the course of the webbing and resting on the bed of the water, stay-ropes slidably connected with said members adjacent their lower ends and connected with the said webbing, a tie connected with said members, means to suspend said webbing from said tie, and guys for said members.

16. In a support for trap-nets, a series of supporting members disposed along the course of the webbing and embodying oppositely-disposed legs, and stay-ropes slidably connected with said legs adjacent their lower ends and connected with the said webbing.

17. In a support for trap-nets, a supporting member including legs disposed at opposite sides of the webbing, ribs on the webbing at the said legs and at opposite sides thereof, and stay-ropes slidably connected with said legs and secured to said ribs.

18. In a support for trap-nets, a series of supporting members comprising sheers straddling the course of the webbing, a tie connected with said sheers, and vertically-disposed ribs secured to said webbing and to said tie.

19. In a support for trap-nets, a series of supporting members comprising sheers straddling the course of the webbing, a tie connected with said sheers, vertically-disposed ribs secured to said webbing and to said tie, and stay-ropes slidably connected with the legs of said sheers and secured to said ribs.

Signed at Seattle, Washington, this 16th 120 day of March, 1904.

THOMAS E. P. KEEGAN.

Witnesses:
 J. C. NUTTING,
 M. M. GROUT.